United States Patent
Eales et al.

(10) Patent No.: US 7,653,389 B2
(45) Date of Patent: Jan. 26, 2010

(54) CALL PROCESSING IN MOBILE TELECOMMUNICATIONS NETWORKS

(75) Inventors: Michael David Eales, Bristol (GB); Michael Andrew Williams, Mid. Glamorgan (GB); Dominic Desmond Phelim O'Neill, Bristol (GB); Christopher Shaw, Bristol (GB)

(73) Assignee: Orange Personal Telecommunications Services Limited, Bristol (GB)

( * ) Notice: Subject to any disclaimer, the term of this patent is extended or adjusted under 35 U.S.C. 154(b) by 476 days.

(21) Appl. No.: 10/497,552

(22) PCT Filed: Dec. 20, 2002

(86) PCT No.: PCT/GB02/05843

§ 371 (c)(1),
(2), (4) Date: Nov. 8, 2004

(87) PCT Pub. No.: WO03/056867

PCT Pub. Date: Jul. 10, 2003

(65) Prior Publication Data

US 2005/0083940 A1    Apr. 21, 2005

(30) Foreign Application Priority Data

Dec. 21, 2001  (GB) .................... 0131123.2
Oct. 24, 2002  (GB) .................... 0224777.3

(51) Int. Cl.
*H04W 4/00*  (2009.01)
(52) U.S. Cl. ............... 455/433; 455/412.1; 455/412.2; 455/432.1
(58) Field of Classification Search ......... 719/310–320; 709/228; 455/433, 422.1
See application file for complete search history.

(56) References Cited

U.S. PATENT DOCUMENTS 5,734,700 A    3/1998  Hauser et al.

(Continued)

FOREIGN PATENT DOCUMENTS

EP    1109417 A1    6/2001

(Continued)

OTHER PUBLICATIONS

Eng et al., A wireless broadband ad-hoc ATM local-area network, Wireless Networks, vol. 1, Issue 2 1995, pp. 161-174.*

(Continued)

*Primary Examiner*—Diem K. Cao
(74) *Attorney, Agent, or Firm*—Townsend and Townsend and Crew LLP

(57) ABSTRACT

A mobile telephone network has a function (30) which interacts with the platform (40) or platforms processing a call, event or session to: a) determine the services and/or call handling operations to be applied to the call, event or session; and b) determine if the platform(s) (40) are capable of carrying out the services and/or call handling operations required by the call, event or session. The function may then arrange for the platform (40) to be provided with appropriate data or for the call, event or session to be transferred to another platform. Moreover, a call may have part of its data converted into a standard protocol, and the data in that standard protocol then be used to guarantee a trigger for processing the call at a transfer device.

13 Claims, 8 Drawing Sheets

U.S. PATENT DOCUMENTS

| | | | |
|---|---|---|---|
| 5,815,810 A * | 9/1998 | Gallant et al. | 455/433 |
| 5,920,820 A * | 7/1999 | Qureshi et al. | 455/461 |
| 5,963,630 A | 10/1999 | Dabbs et al. | |
| 5,978,681 A * | 11/1999 | Bertacchi | 455/445 |
| 6,044,274 A | 3/2000 | Vo et al. | |
| 6,192,250 B1 * | 2/2001 | Buskens et al. | 455/463 |
| 6,216,173 B1 * | 4/2001 | Jones et al. | 715/705 |
| 6,553,427 B1 * | 4/2003 | Chang et al. | 719/314 |
| 6,782,412 B2 * | 8/2004 | Brophy et al. | 709/204 |
| 6,938,087 B1 * | 8/2005 | Abu-Samaha | 709/227 |
| 7,062,265 B1 | 6/2006 | Chang et al. | |
| 2001/0037393 A1 * | 11/2001 | Park et al. | 709/228 |
| 2002/0087704 A1 * | 7/2002 | Chesnais et al. | 709/228 |
| 2004/0162068 A1 * | 8/2004 | Lamb et al. | 455/432.1 |

FOREIGN PATENT DOCUMENTS

| | | |
|---|---|---|
| WO | WO01/33803 | 5/2001 |

OTHER PUBLICATIONS

Lin et al., Integrated planning and management of survivable wireless communications networks, Communications, 1999. APCC/OECC '99. Fifth Asia-Pacific Conference on, vol. 1, Oct. 18-22, 1999 pp. 541-544 vol. 1.*

$3^{rd}$ Generation Partnership Project; Technical Specification Group Terminals; Multimedia Messaging Service (MMS); Functional description; Stage 2 (Release 4), Mar. 2001.

* cited by examiner

CALL PROCESSING IN MOBILE TELECOMMUNICATIONS NETWORKS

BACKGROUND OF THE INVENTION

1. Field of the Invention

The present invention relates to mobile telephone networks, and in particular to the processing of calls or other subscriber events or sessions in such networks. Such calls, events and sessions may include, for example, the sending and receiving of messages (SMS), General Packet Radio System (GPRS) events, Internet and Intranet sessions, and the provision of multimedia services. Subsequently, the term 'call' will be used to refer to any or all of such calls, events or sessions. Call processing is the operation or operations carried out by the network and by services supported within the network in response to initiation of a call by user. Call processing may be considered as involving either or both of call handling and service handling, the former being the operations associated with putting a call into effect on the network, and the latter being the operations associated with the delivery of a service as part of the call.

2. Summary of the Prior Art

Mobile telecommunications networks provide more services than the simple establishment of a communication path from one telephone (mobile or land line) to another telephone (mobile or land landline). For example, services such as voice messages may be provided to subscribers to the network, and the network operator may also provide facilities such as call barring, call forwarding, messaging facilities (SMS), voice-mail, WAP, internet access, location based services and content services. A further issue is that mobile telecommunications networks generally have a more complex charging structure than land-based networks, and the facility for pre-payment for calls means that the network must be able to determine if the mobile telephone being used can be permitted to function.

In order to achieve this, a mobile telecommunications network may have a series of call handling and/or service handling platforms, each able to carry out one or more specific functions. The processing of a call may involve a plurality of platforms with parts of the call processing being performed on respective platforms and the call being passed from one platform to another at different stages in the processing of the call. Thus, for example, if a pre-pay subscriber wishes to access a voice message, the operations of assessing whether the subscriber has sufficient credit to use the service, and the provision of the voice message itself, may be carried out on different platforms. It should be noted that a platform is a logical structure, i.e. the hardware/software required to carry out the function or functions provided by that platform may be distributed around the network.

In some current arrangements, each platform must act as a relatively self-contained unit, and thus must have access to information about each user. Thus, in the known arrangements, call processing platforms must have, or have access to, an appropriate database, and must also be capable of understanding all possible instructions (i.e. processing commands from the subscriber or network) that can be used.

This creates three problems. Firstly, it makes each call processing platform complex. Secondly, since different platforms may operate to different protocols, incompatibilities can occur, for example as a call is passed from one platform to the other at different stages in call handling. Thirdly, if the subscriber to a mobile telephone communications network moves ("roams") to a different network e.g. moves from one country to another, the services provided by the home network may not be provided by the new network, so the subscriber cannot be provided with those facilities as they move ("roam"). This third problem is particularly acute for pre-pay subscribers; their credit status is stored on the home network but a network to which they have roamed will not have access to their credit status, and thus current arrangements do not permit pre-pay users to roam as extensively as other subscribers.

SUMMARY OF THE INVENTION

First Aspect of the Invention

The present invention seeks to address these problems, and at its most general a first aspect of the invention proposes that the network provides a management or "broker" function which interacts during the processing of the call with the platform or platforms (including either or both of call handling and service handling platforms) to determine how that call is to be processed. Thus, for example, when a user starts a call which is received at a platform for call handling, that platform passes information about the call and the functions required by that call to the broker function, to enable the broker function to determine how that call should be handled.

The broker function may then carry out any or all of the following activities:

1. it determines the services to be applied to the call and/or the call handling operations that the call requires.

2. it determines if the platform currently processing the call is capable of performing the functions required by that call. If it is not, then it may cause the platform to pass the call to a different platform which is capable of providing the appropriate functions or to cause a service handling platform to operate on the call and thus it determines which service platforms will be needed to provide the services required by the call as part of the service handling.

3. it collates the data which the or each platform needed to process the call will require. It can then provide appropriate data to the platform or platforms. This is particularly important when the call is to processed by more than one platform, since the same data may be used by multiple platforms. It also permits the data to be adapted to different protocols.

4. it carries out any protocol conversions needed to ensure that the or each platform needed to process the call can operate correctly.

5. it ensures that, if a sequence of steps is needed to process the call, that steps are carried out in the correct order.

In practice, at least activities 1 and 2 will be needed for any call, and the broker function should at least ensure, in activity 4, that the platforms can process the call correctly. Activities 3 and 5 may be needed depending on the call, but are not always essential.

The fact that the broker function collates the data required to process the call means that each platform may be simplified, as each platform does not then need to have a complete-database of user information. Instead, that information may be provided by the broker function at the time of handling the call. Secondly, since the broker function determines the processing that the call needs, and hence which platforms will be involved in that processing, it can provide protocol conversion information to enable the call to be passed between mutually incompatible platforms. Thirdly, because it can trigger one platform to pass the call to another, when the first platform cannot carry out the function or functions required by the call, it can permit the user to be provided with all functions available at the home network, while roaming, by passing the processing of the call of a platform within the network to which the user has roamed to another platform, e.g. in the home network. This feature may also be used in the home network when that network has platforms of different capabilities.

In order to carry out this operation, the broker function must be able to access appropriate user information provided on one or more databases of the network, and should be able to establish a handling sequence for the call and/or a sequence for services required.

Thus, as mentioned above the broker function may carry out some or all of the following activities:

Identification: the first stage in the processing of a call is for the service broker to identify the services to be applied to the call and/or the call handling operations that the call requires. The service handling and call handling operations are determined primarily by the nature of the call, but in order to carry out the identification the service broker may have to send queries to other databases, and/or to inspect internal data.

Negotiation: the second stage in the processing of the call is for the service broker to determine if the platform, particularly the service switching function of the platform, can perform all the services and handling operations which have been identified. If not, it determines an appropriate other platform to perform the, or at least some, of services and/or call handling.

Correlation: as previously mentioned, the service broker may collate (correlate) the data which the platform or platforms needed. The correlation may involve the merging of data from different platforms, where the call requires such multiple platforms, so that the service broker establishes a single data set for processing of the call.

Mediation: where the protocols of the platforms involved in processing the call are different, it is desirable that the service broker performs the necessary protocol conversions. The service broker can then ensure that relevant protocols and procedures are met during the processing of the call.

Sequencing: where the processing of the call involves multiple steps, the service broker ensures that those steps are carried out in the correct order. Where multiple services are provided, they too are sequenced.

Second Aspect of the Invention

The second aspect of the invention is concerned with a situation in which the call may be a Multi Media Message. A Multi Media Message is one which may contain images, video, text and/or voice or other sound data or any combination of such media. In subsequent discussions, such calls will be called MMS calls.

It is possible to devise arrangements for processing of MMS calls which are proprietary, in the sense of allowing-such calls to and from equipment specifically designed for them, from a single manufacturer. However, in a large mobile telephone network, MMS calls may originate from outside the network (for example, from other networks), or using originating devices from different manufacturers. Therefore, it is necessary to develop arrangements for processing MMS calls which are more generally applicable.

As its most general, the second aspect of the present invention proposes a call is initially handled by a protocol conversion unit which converts at least part of the data representing that call to a standard protocol. The resulting signal is then sent to a transfer device in which it is used as a trigger for processing the call. If the call is destined for another network, it may be sent from the transfer device to another conversion unit which converts it from the standard protocol to the protocol of that network, or it may be returned by the transfer device to the same or equivalent conversion unit of the originating network for onward distribution within that network. In either case, the processing of the call is handled in response to the trigger in the common protocol.

It should be noted that although this second aspect of the present invention has been developed for processing MMS calls, the second aspect is not limited to the processing of such calls. The principles of the second aspect discussed above may be applied to other types of calls such as the handling of e-mails, other text messages or World Wide Web (WWW) signals and addresses. However, in the subsequent discussion, for the sake of simplicity of terminology reference will be made subsequently only to MMS calls when discussing this second aspect.

In order to respond to the triggers, an appropriate unit is needed which transiently stores the MMS call, so that an appropriate analysis may be carried out to determine how that MMS call then needs to be processed. That analysis may be carried out by the broker function of the first aspect of the invention, in that it can determine which platform is needed to provide the appropriate functions for the MMS call.

The use of data in a common protocol being used as a trigger means that it is possible to arrange for charges to be based on the origin of the call with a charge based on the message size. MMS messages may comprise large amounts of data, depending on the complexity of the media such as sound and/or image being sent, and the use of a trigger permits the network operator to charge on the basis of the load that the MMS call imposes on the network. It also enables integration with prepaid charging arrangements.

BRIEF DESCRIPTION OF THE DRAWINGS

Embodiments of the present invention will now be described in detail, by way of example, with reference to the accompanying drawings in which.

DETAILED DESCRIPTION

First Embodiment

The first embodiment of the present invention relates to a mobile telecommunications network embodying the first aspect of the invention, namely the provision of a management or "broker" function.

Figure 1:
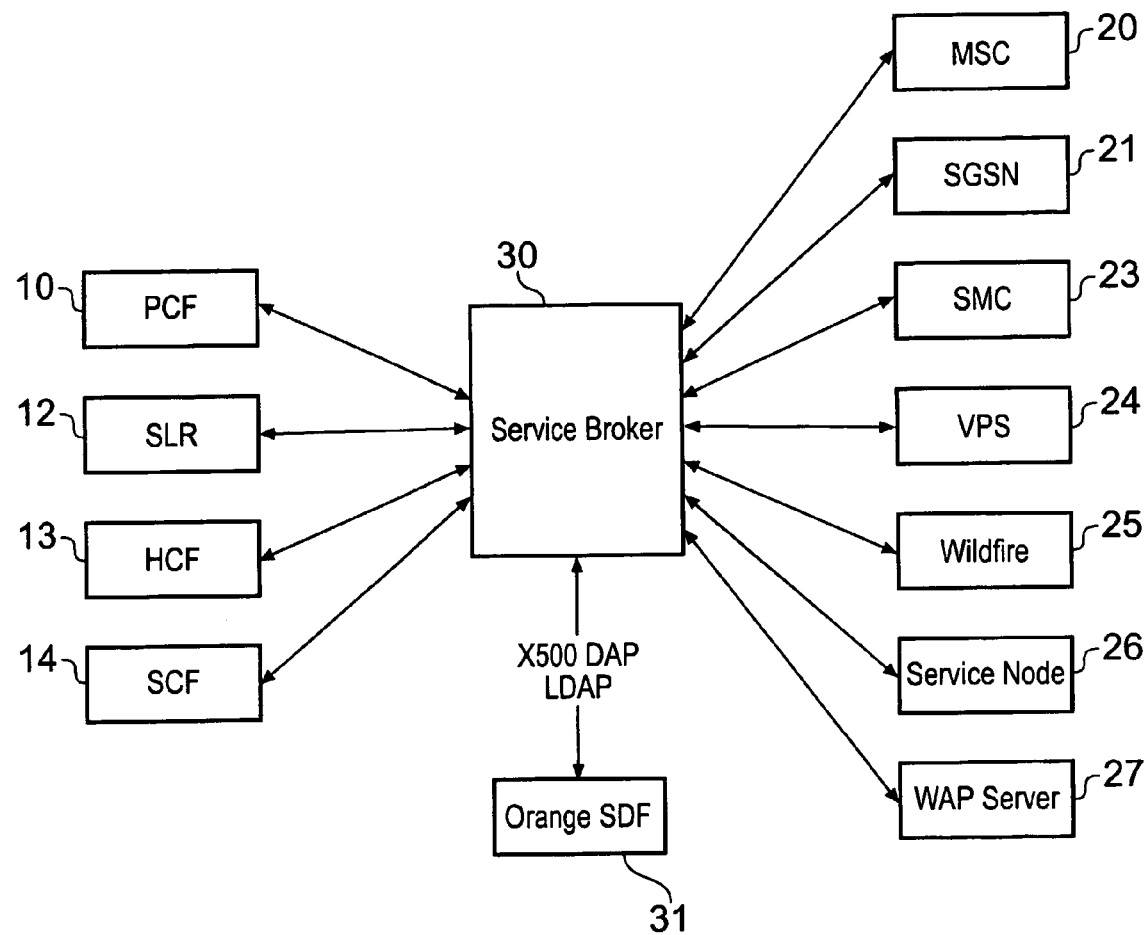
FIG. 1 is a schematic block diagram showing the linking of a broker function to other functions of a mobile telecommunications network.

Referring first to FIG. 1, a mobile telecommunications network carries out a multiplicity of functions, and these may be considered to be divided among a plurality of platforms. Some of those platforms are concerned with the internal operation of the network and the establishment of a telecommunications link from one point of the network to the other, and others are platforms for carrying out service operations.

FIG. 1 identifies five network (or service handling) platforms:

a PCF 10 being a Prepaid Control Function a SLR 12 being a location register (Service Location Register) corresponding to the register described in WO/GB95/02352 which contains information relating each telephone number to a corresponding one of a plurality of home location registers (HLRs) of the network, which are not shown in FIG. 1.

HCF 13 being a Home Location Register Control Function

SCF 14 indicating a generic services platform for carrying out other services associated with the call. Each of PCF 10, SLR 12 and HCF 13 may be considered a specific type of SCF.

The call handling platform shown in FIG. 1 include:

an MSC 20, being a mobile switching centre for providing the call with an appropriate communication route. In practice, a communication network will have many such MSCs 20.

an SGSN 21, being a Serving GPRS Support Node.

an SMC 23, being a Short Message Centre.

a VPS 24 being a voice processing system for receiving voice messages.

a Wildfire 25 being a voice activated voicemail and personal assistant service.

a Service Node 26 being an entity (device and/or function) moving service control, service details and specialised resource functions a WAP Server 27, being a web server capable of serving web pages in a format that can be delivered to a mobile telephone.

According to the first aspect of the present invention, all these platforms are linked by a broker function 30, which controls the activities of the platforms 10 to 14 and 20 to 27 in dependence on the way the call and services are to be handled. The broker function links to the network functions 10 to 14 and the call handling platforms 20 to 27, and also to a database 31. That database 31 may be a distributed database as described in WO99/35867.

Figure 2:
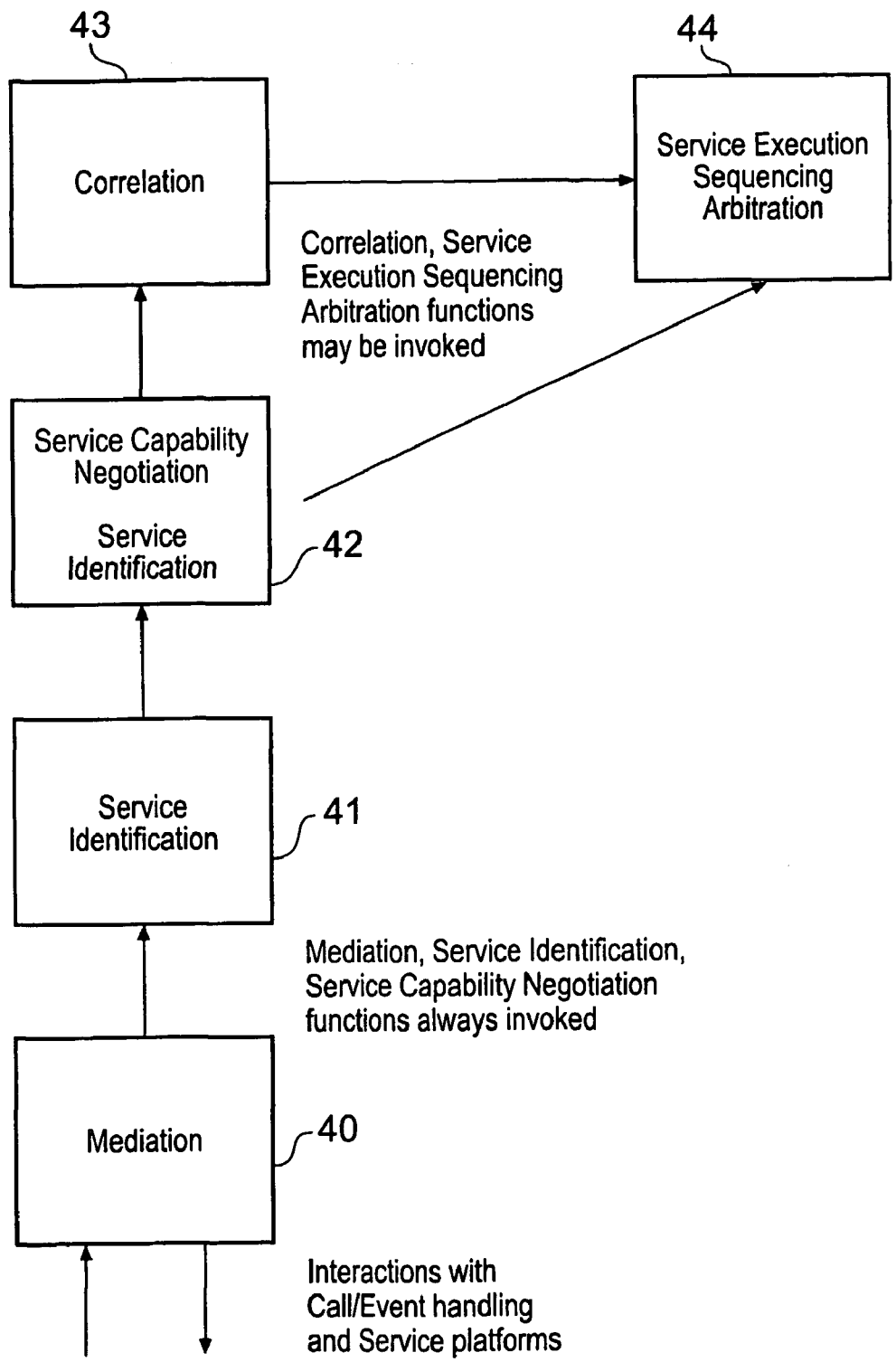
FIG. 2 is a flow chart showing the operations carried out by the broker function of FIG. 1.

FIG. 2 then illustrates the main operations carried out by the broker function 30 of FIG. 1. When a call is involves one of the platforms 10 to 14 and/or 20 to 27, the broker function 30 establishes a mediation operation 40 which interacts with the platform at which the call has been received, and may also interact with other platforms depending on the nature of the call.

To permit the broker function 30 to carry out that mediation operation, the broker function 30 carries out an identification operation 41 which identifies the service or services required by the call, assembles the data required to permit that service handling, and assembles the data required for call handling. In order to do this, the broker function 30 may access the database 31 to determine relevant data relating to the call and/or the subscriber.

Depending on the nature of the service or services required by the call which have been identified by the operation 41, the broker function 30 must then establish if the platform which has received the call is capable of handling the call and which service or services are required by that call. It therefore carries out a capability operation 41 which links to the service switching function (SSF) of the appropriate platform 20 to 27, to determine the capabilities of that SSF. If the platform 20 to 27 is not capable of providing the appropriate operations, the broker function 30 may then establish links to other platforms capable of carrying out those services and operate to complete these functions of the other platforms. The service switching function (SSF) is a function which receives indications from the call handling platform that points in call (PICs) have been reached. The SSF then requires instructions from a service control function (SCF). The SCF implements the service logic and gives the SSF instructions to continue, reject and/or perform other operations such as modify the call instruction, arm cell reports and measure call times. The SSF takes there instructions and steps through a predefined state machine, passing instructions and information back to the call handling software and SCF as appropriate. The SSF is hosted in a physical mode called a service switching point (SSP) and the SCF is hosted in a physical node called a service control point (SCP).

Thus, if the call requires multiple services, then the broker function 30 must carry out a correlation operation 43 to correlate the information required by whichever of the platforms 10 to 14 and 20 to 27 is to provide the appropriate operations (call handling, service handling). The correlation will normally involve a variety of platforms, and the broker function derives from the database 31 a single set of data for the call that can be used by the broker function 30 and the appropriate platforms 10 to 14 and 20 to 27 for carrying out the operations required. Thus, the broker function can carry out correlation for capability negotiation, generally involving platform 20 to 27, and multiple service correlation, generally involving platforms 10 to 14. Where such multiple platforms are involved, the broker function 30 must carry out a sequencing operation 44 which determines the order in which the multiple operations are to be provided, and thus the order in which the platforms 10 to 14 and 20 to 27 are to provide those operations. That sequencing operation 44 may also be needed even when multiple platforms are not needed, and so the correlation operation 43 is not carried out, when a plurality of services are to be provided at a single platform.

Figure 3:
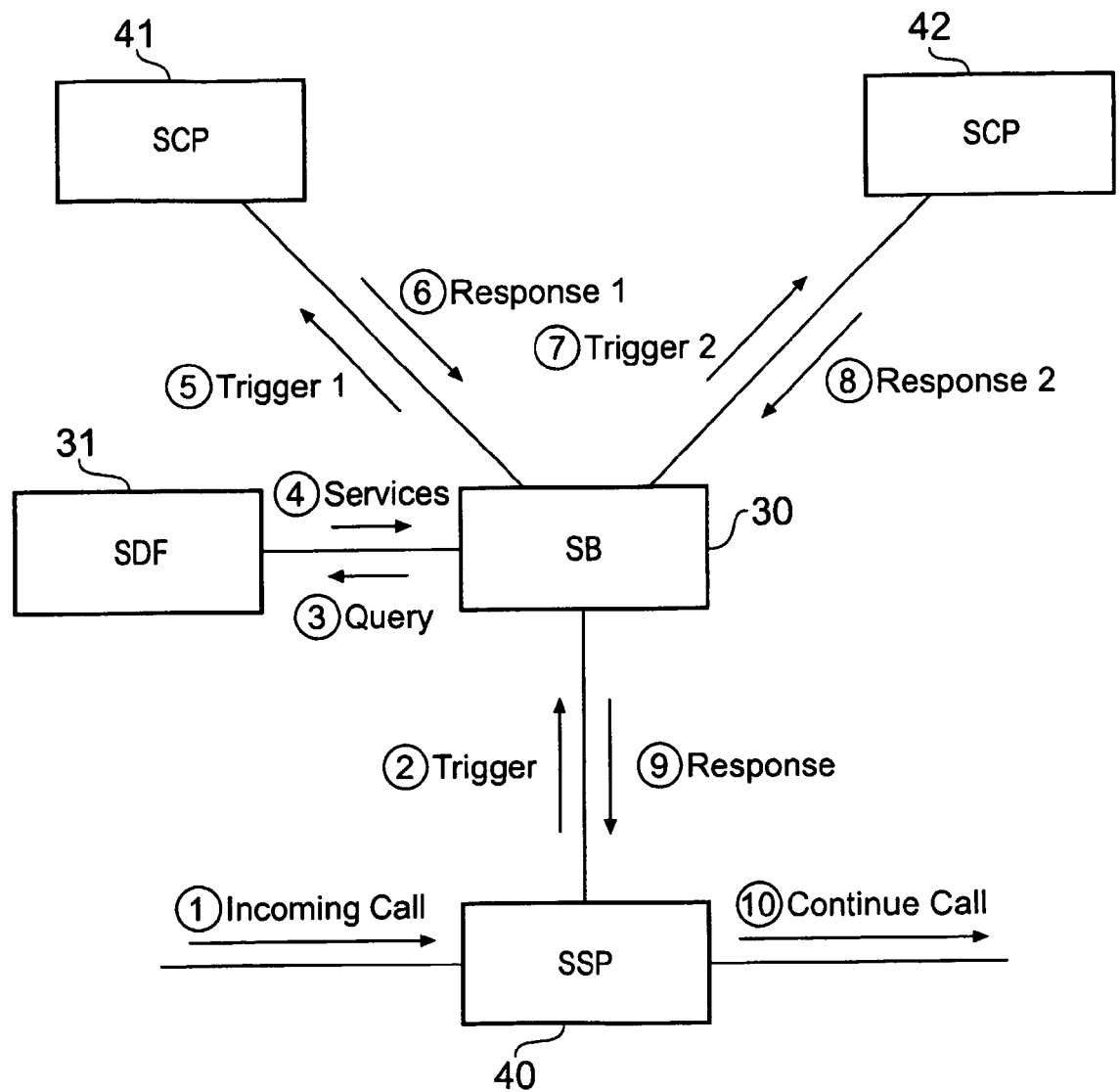
FIG. 3 is a diagram illustrating a first example of call handling using the first aspect of present invention.

Three examples of the operation of the network of functions illustrated in FIG. 1 will now be described with reference to FIGS. 3 to 5. In those figures, numerals in circles indicate the stages in the handling of the call.

Example 1 of First Embodiment

In this example, it is assumed that a call requires multiple services.

The incoming call is received at an SSP 40 of the platform to which the call has been received, and this triggers a signal to the broker function 30 and the broker function 30 may access database 31 to establish the operations to be carried out. That trigger contains the data indicating the operations to be carried out in response to the call. In the example of FIG. 3, it is assumed that the operations require access to SCPs 41, 42. However, before signalling to those SCPs 41, 42 the broker function 30 signals to the database 31 to assemble the data necessary for all the services that are to be carried out by the call and/or service handling platforms. The broker function 30 then sequentially interrogates the SCPs 41, 42 to trigger each of those SCPs 41, 42 to generate the appropriate information which is collated by the broker function 30 and the response is then passed to the SCP 40, to enable the call to continue.

In some cases, the actions performed by the respective SCPs 41, 42 will be independent. Thus, for example, one of the SCPs 41, 42 may merely translate the call number to another number and in such cases the broker function 30 may simply assemble an aggregate of such operations. However, in some cases, one of the SCPs 41, 42 may need to be involved throughout the call. For example, if one of the SCPs is linked to the SCF 14 involved in a pre-pay call, then the broker function 30 may need to produce an aggregate result for the SSP 40.

Example 2 of First Embodiment

Figure 4:
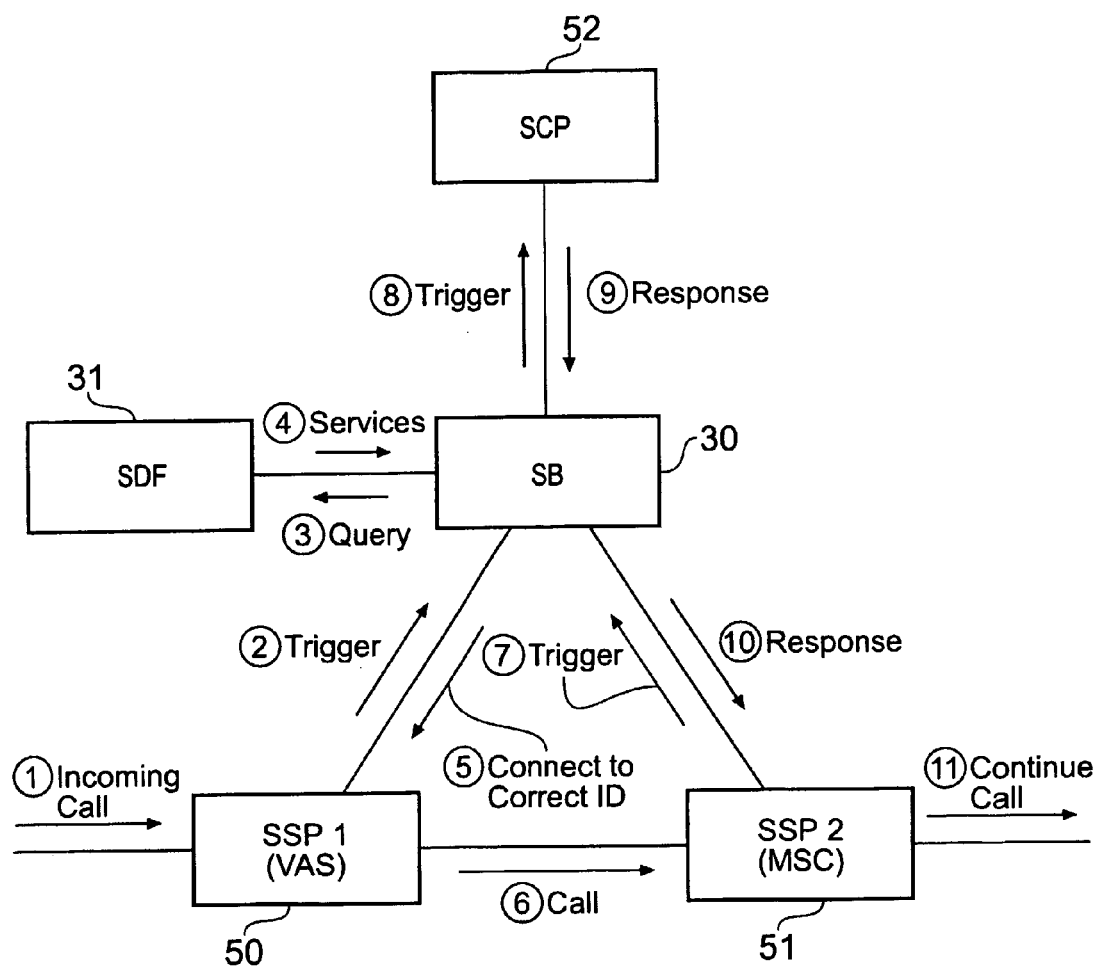
FIG. 4 is a diagram illustrating a second example of call handling using the first aspect of present invention.
Figure 5:
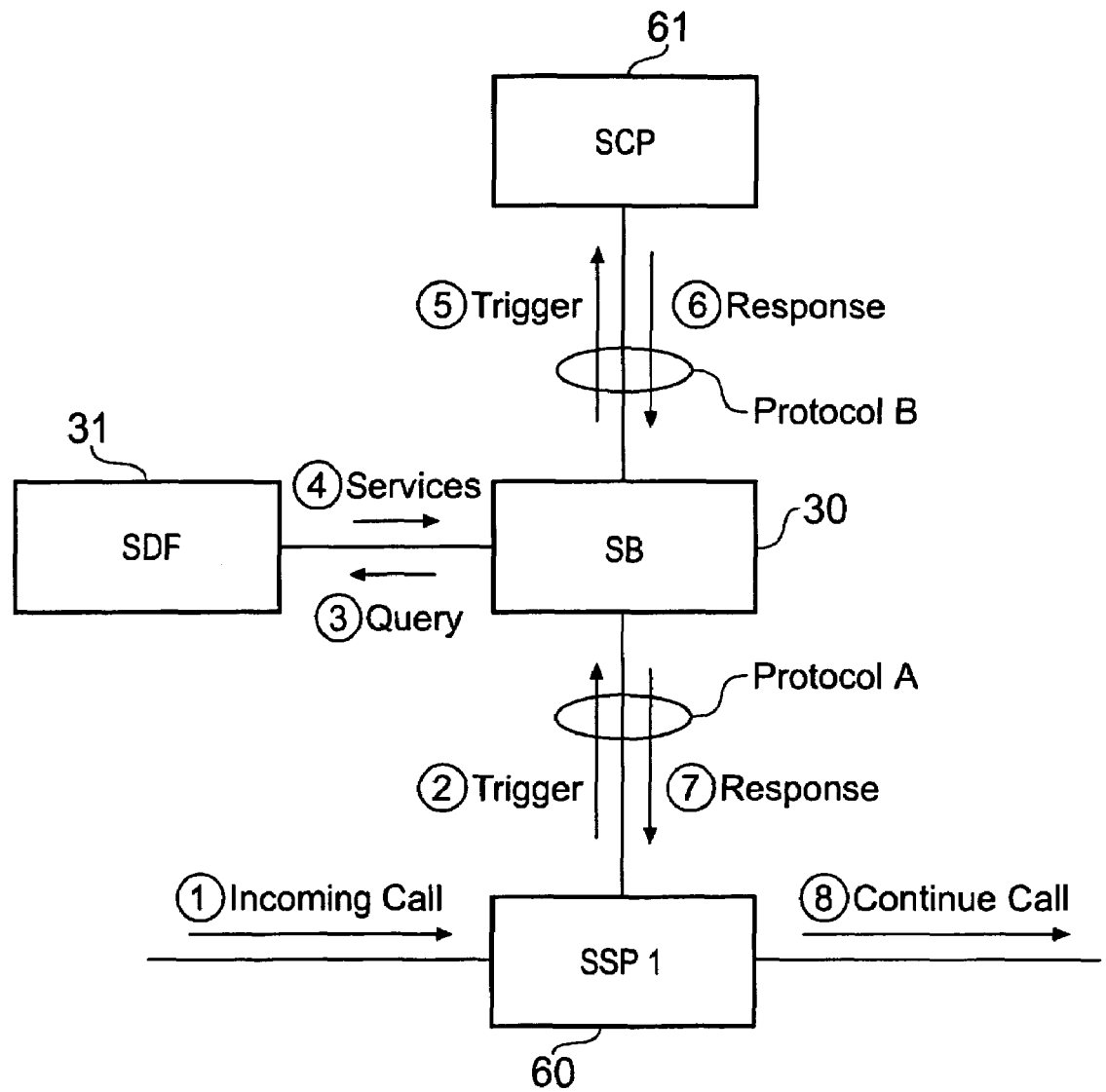
FIG. 5 is a diagram illustrating a third example of call handling using the first aspect of present invention.

FIG. 4 shows an example in which the SSP which first receives the call is not able to carry out all the operations required.

Thus, if a call is received at a first SCP 50 of a platform which does not have sufficient capability to carry out the operations required, the SSP 50 signals to the broker function 30. As in example 1, the broker function 30 accesses the database 31 to obtain all the data necessary for the handling of the call, and then allocates a temporary correlation identity to the call, which correlation identify is passed back to the SSP 50. That correlation identity causes the SSP 50 to pass the call to a second SSP 51 of a platform which can provide the operators required by the call and the receipt of the call by that SSP 51 generates a trigger to the broker function 30 which accesses an appropriate SCP 52 to obtain appropriate response information which is passed to the SSP 51, which may then permit the call to continue within the platform which is handling it.

Thus, the broker function 30 chooses the second SSP 50 on the basis of the operations needed to be carried out to handle the call, and hence identifies the data from database 31 to handle that call, and the appropriate SSP 51 to handle that call, before generating the correlation identity which is passed to the SSP 50.

Note that, in Example 2, it is assumed that the call requires access to only one SCP 52. In some cases, multiple SCPs will need to be interrogated as in Example 1, and such interrogation can occur in the same way as Example 1 once the call has been passed to the SSP 2, although noting that, by that time, the broker function 30 will already have accessed the database 31.

Example 3 of First Embodiment

The third example is concerned with the case when the handling of the call involves different protocols. Referring to FIG. 5, a call is received at an SSP 60 which generates a signal to the broker function 30 indicating the services needed. In this example, it is assumed that the SSP 60, and hence the signals it produces, operate to a first protocol A. The broker function 30 may access the database 31 as before to obtain the data for call handling, if the trigger from the network does not itself contain enough information, and interrogates the appropriate SCP 61 to obtain the information to handle the call. If the SCP 61, and hence the signals it is to receive and transmit, operate according to a second protocol B, then the broker function 30 mediates between those different protocols as illustrated in FIG. 5. If the broker function 30 has assembled all the information to handle the call from the database 31 and the SCP 61, it passes a response to the SSP 60, in the protocol A appropriate for that SSP 60.

As can be seen from the above three examples, the broker function 30 accesses the database 31 each time that it is aware that one of the call handling platforms has received a call, for all types of calls, the broker function 30 identifies, and collects together, the data necessary to handle the call. Hence, the call handling platforms can be relatively simple, storing only minimum data. Any data that they need specific to the handling of a call can be transferred from the broker function 30, which has itself received it from the database 31.

Second Embodiment

A second embodiment of the invention will now be described, being an embodiment of the first aspect of the invention.

Figure 6:
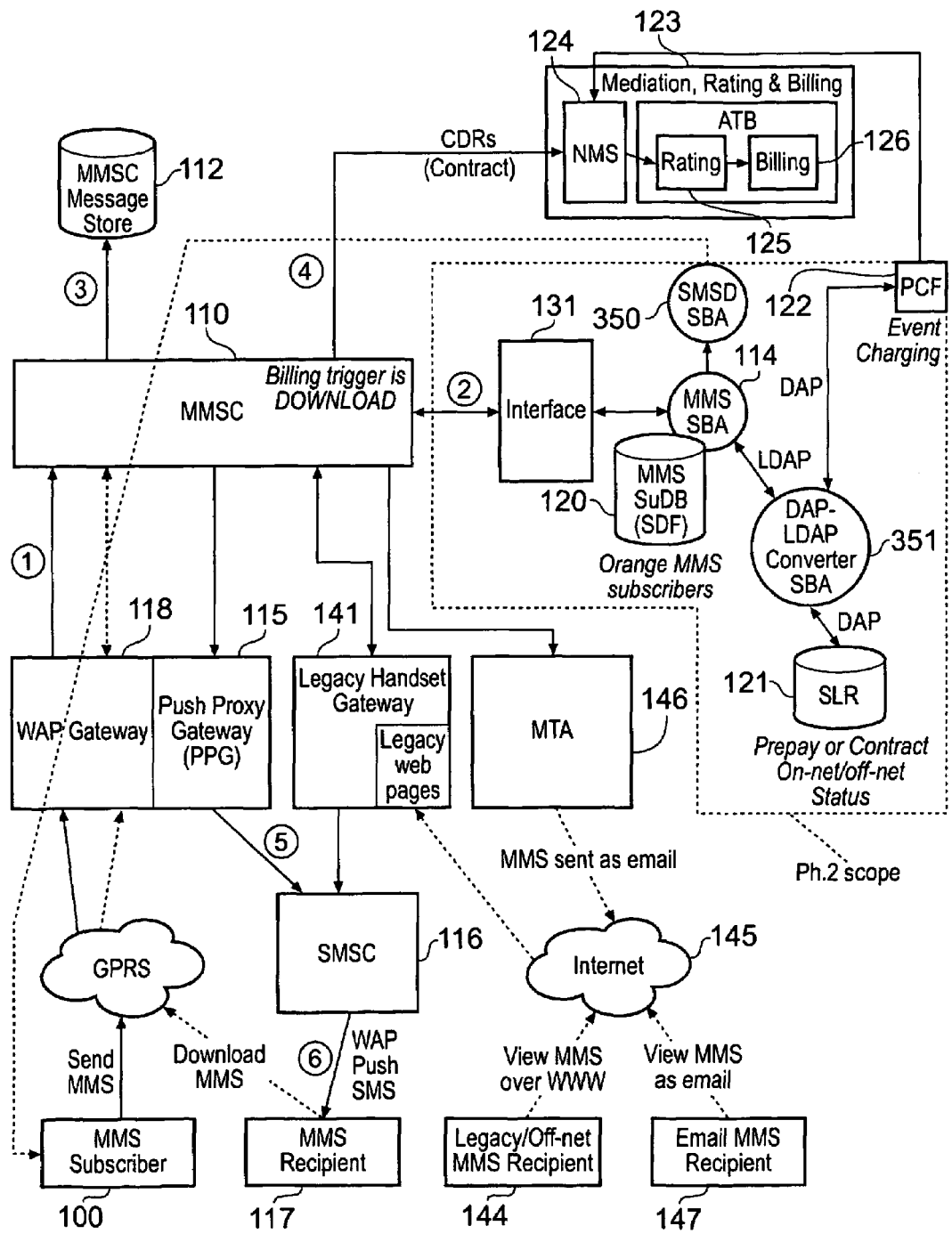
FIG. 6 is a diagram illustrating an embodiment of the first aspect of the invention.

Referring to FIG. 6, a call being a Multi Media Message (MMS) is created at e.g. a mobile telephone handset 100 of a subscriber from which the message (the Multi Media content of the call) is transmitted to a Multi Media Message Service Centre (MMSC) 110. The originating handset 100 sends the MMS call via GPRS 140 and a WAP gateway 118 to the MMSC 110. The MMSC acts as a temporary store for the MMSC call and for this purpose may have a message store 112 associated therewith.

The MMSC 110 operates according to a protocol determined by the network in which it is located. In this embodiment, the MMSC 110 communicates via a middleware interface 131 to a service broker unit 114 which carries out the broker function of the first aspect of the invention discussed above with reference to FIGS. 1 to 5. Thus, the service broker unit 114 determines the processing necessary for the call.

FIG. 6 illustrates an embodiment in which the MMS call is intended for a destination within the originating network itself. Thus, once the service broker 114 has determined the processing necessary for the call, the processing of the call is returned to MMSC 110. In particular, the MMSC may send a WAP message to a push proxy gateway 115 which forwards it to an SMSC 116 and onto an appropriate handset 117 capable of displaying the message of the MMS call. This is illustrated by the arrows 5 and 6 in FIG. 6. The push proxy gateway 115 acts to format and transfer the signals originating from the MMSC 110 for onward delivery to a short message service (SMS) structure forming the SMSC 116, to enable appropriate transfer to occur.

The push proxy gateway 115 and the WAP gateway 118 may be achieved by the use of WAP gateways, since such gateways may contain the necessary functionality for both elements. It is preferable to use two such gateways in a load balance configuration, with one gateway acting as the WAP gateway and the other as the push proxy gateway. However, since each gateway has both functionalities, it is possible to use one such WAP gateway to carry out both functions, e.g. if one fails.

As illustrated in FIG. 1, the service broker may be connected to a service data function (SDF) unit 120 as illustrated in more detail in PCT WO 99/35867 and a register unit (SLR unit) 121 as illustrated in more detail in PCT WO 96/11557. In this way, the SDF unit 120 may store MMS subscriber data, which will be required by the MMSC 110. In performing its function, the service broker unit 114 may thus obtain information from the SDF unit 120 to determine how the call is to be processed. Similarly, the service broker unit 114 may extract relevant information from the SLR unit 121 to obtain originating and destination party MSISDN numbers.

There are then two possibilities. The first is that the originating handset 100 has post payment arrangements with the network provider operating the MMSC 110. In that case, appropriate billing arrangements may be put in train. However, if the originating handset 100 is operating on a prepayment arrangement, then a check must be made that there is appropriate credit before the MMS call is forwarded. For this purpose, the service broker unit 110 may send a signal to a prepay control function (PCF) 122, that signal indicating the original party and an indication of the type and size of the message of the MMS call. The prepay control function 122 may then send appropriate signals to the billing operations of the network schematically illustrated at 123. Those billing operations include an network mediation system (NMS) unit 124 which generates signals to enable rating and billing functions 125, 126 to be carried out. FIG. 6 also illustrates that the NMS unit 124 receives trigger signals from the MMSC 110 itself.

The MMSC 110 may contain a subscriber database interface unit (not shown in FIG. 6) which passes queries generated by the MMSC 110 to the service broker unit 114 via the middleware interface 131. In this way the service broker unit 114 may control the subsequent processing of the call by the MMSC 110.

Suppose now that a MMS call is generated by the handset 100 in FIG. 6 but the handset 117 being the destination terminal does not support multimedia functions. In that case, the MMSC 110 routes the call to a Legacy Handset gateway 141, which stores the MMS call. In addition, it generates a message in SMS form to SMSC 116, where it may be forwarded to the handset 117 to signal to the user of that handset 117 that a multimedia message has been stored. The signals to the handset 117 may thus be standard messages. The user of e.g. handset 117 may then use an appropriate computer 144 to connect via the internet 115 to the Legacy handset gateway 141 to permit the Multi Media Message to be retrieved. The Legacy handset gateway 141 may thus contain web servers to provide appropriate access. Moreover, it is possible for the Multi Media message to be sent to an e-mail address. This is carried out by a mail transfer agent 146 which receives the call from the MMSC 110 and converts it to an e-mail which is sent via the internet 145 to suitable computers 144, 147.

Many modifications of this embodiment are possible. For example, FIG. 6 assumes that the originating handset 100 and the destination handset 117 are customers of the same network and both are in their home network. It is possible however, that they are customers of different networks in which case the call needs to be transferred from the MMSC 110 of the originating network to an equivalent MMSC in the destination network. The action of the service broker 114 is then particularly important.

In particular the service broker 114 must determine which network owns the number of the destination handset 117 and therefore where to send the MMS and how to modify the address of the message appropriately to ensure that it gets to the correct network.

It may be that the network owning the destination number does not have an interconnect agreement with the operator of the MMSC 110 in which case the service broker 114 may decide to send the message to the Legacy handset gateway 141.

The service broker will also identify which network the originating handset is currently located in when sending the MMS. This can be used to modify the tarrifing as appropriate.

When the destination handset 117 is roaming from its home network, the MMSC will send a message (e.g. an SMS message) to the destination handset 117 to tell the user to contact the MMSC 110 of the home network to pick up the MMS message from the home network.

When the originating handset 100 is roaming from its home network, the MMS message is routed to the MMSC 110 of the home network, which then processes it in the ways described with reference to FIG. 6. Such operations is reliant on the visited (roamed to) network supporting the appropriate network capabilities to enable MMS messages to sent and received.

If it is assumed that any multimedia message sent from one network to another will be for a single recipient, a delivery address will need to be resolved before the message is sent, allowing the message to be routed directly to the correct network. A network in which the destination handset is located will require some positive confirmation that the message has been received from a valid originating handset within the originating network. This is needed to remove the risk of fraud or other problems. Appropriate charging information will then need to be created by the operator of the destination network after the MMS call has been successfully received and passed appropriate acceptance checks. These acceptance checks may include, for example, conformance to content type and size criteria, message size, span protection, and any blocking rules applied by either the operator of the destination network or the customer of the destination handset itself.

It should be noted that the detailed architecture of some of the components discussed for handling MMS calls have been described in 3GPP (Third Generation Partnership Product) specifications known to those in the art, particularly specification 23.140.

Third Embodiment

A third embodiment of the invention will now be described with reference to FIG. 7. This third embodiment is an embodiment of both the first and the second aspects of the invention. Many features of this embodiment are the same as the second embodiment of FIG. 6, and the same reference numerals will be used to indicate corresponding parts.

In the second aspect of the invention, the call is converted to a predetermined common protocol, event triggers are created in that common protocol, which event triggers are used to initiate the call processing. To achieve this, the MSC call is converted to a standard protocol, such as Simple Mail Transfer Protocol (SMTP), and passed to a SMTP proxy agent 113. That SMTP proxy agent 113 triggers the processing of the call.

In this embodiment, the SMTP proxy agent 113 is connected to the service broker with 114 which carries out the broker function of the first aspect of the invention discussed above with reference to FIGS. 1 to 5 and FIG. 6. The service broker with 114 determines the processing necessary for the all on the basis of the trigger from the SMTP proxy agent 113. Since the SMTP proxy agent 113 is operating in a known non-proprietary protocol, it is relatively straight forward to design it to generate such triggers independent of the protocol of the MMSC 110.

The SMTP proxy agent 113 extracts from data in the message information which identifies the size of the message, and also may extract from data in the message information which identifies the class or type or media contained within the message. An appropriate signal is then sent to the service broker unit 114. In addition, the SMTP proxy agent 113 sends a response to the MMSC 110 via an MM4 interface to convert originator and receiver addresses as instructed by the service broker unit 114 (note the message may be sent back to the same MMSC 110 (loopback), to another MMSC within the same network or to another MMSC in a different network).

Thus, in the embodiment described above, event triggers are generated at the SMTP proxy agent 113 in a protocol such as SMTP which is not the same as the protocol in which the MMS call is originally created and received by the MMSC 110.

The SMTP proxy agent 113 may be a standard e-mail server which is configured transiently to store MMS messages in order to generate the triggers. Those triggers may be in the form of an Lightweight Directory Access Protocol (LDAP) extended request which contain relevant information, such as the origin and destination of the call, the type of message, the size of the message, etc. This information is passed to the service broker 114 which then determines how the call is to be processed.

Figure 7:
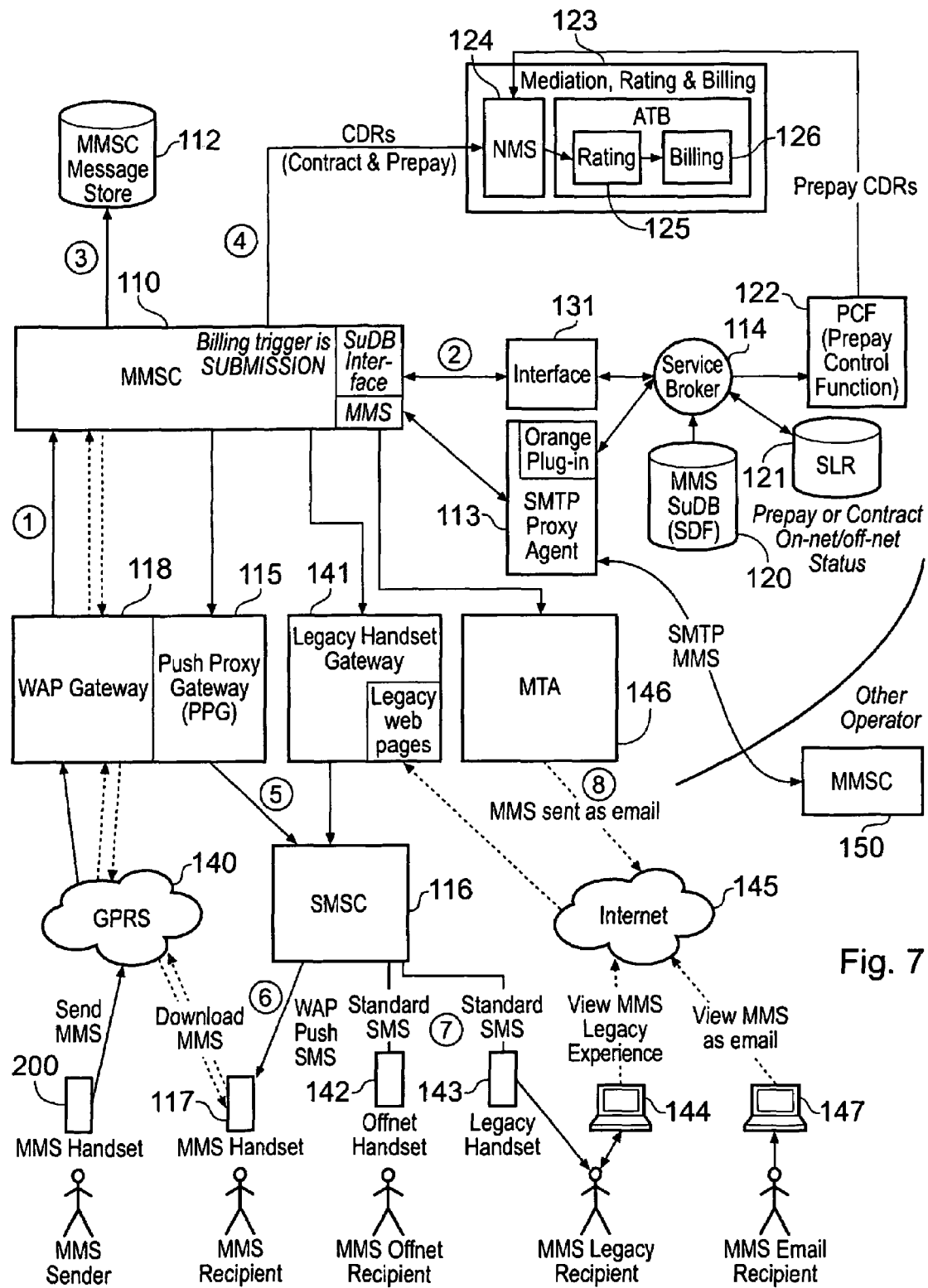
FIG. 7 is a diagram illustrating a further embodiment of the second aspect of the invention.

In FIG. 7, the interface 131 is connected to the MMSC 110 via a subscriber database unit 130 which, as mentioned with reference to FIG. 6, passes queries generated by the MMSC 110 to the service broker unit 114 via the interface 131.

FIG. 7 also illustrates the situation where the MMS call is sent to a destination on a different network from that of the MMSC 110. In that case, the SMTP proxy agent 113 transfers the call in SMTP format to the MMSC 150 of a different operator where it may be handled in exactly the same way as described above. Thus, the MMS call is passed from the MMSC 110 via the SMTP proxy agent 113 to the MMSC 150 in a protocol which is different from either that of the call arriving at the MMSC 110 or the call being sent from the MMSC 150. By operating in a common protocol, in this way, the event triggers generated by the SMTP proxy agent 113 may reliably be produced irrespective of the protocols operated within different networks. It would even be possible for the MMSC 150 to be operated by the same operator as the MMSC 110, where that operator has multiple MMSCs.

Figure 8:
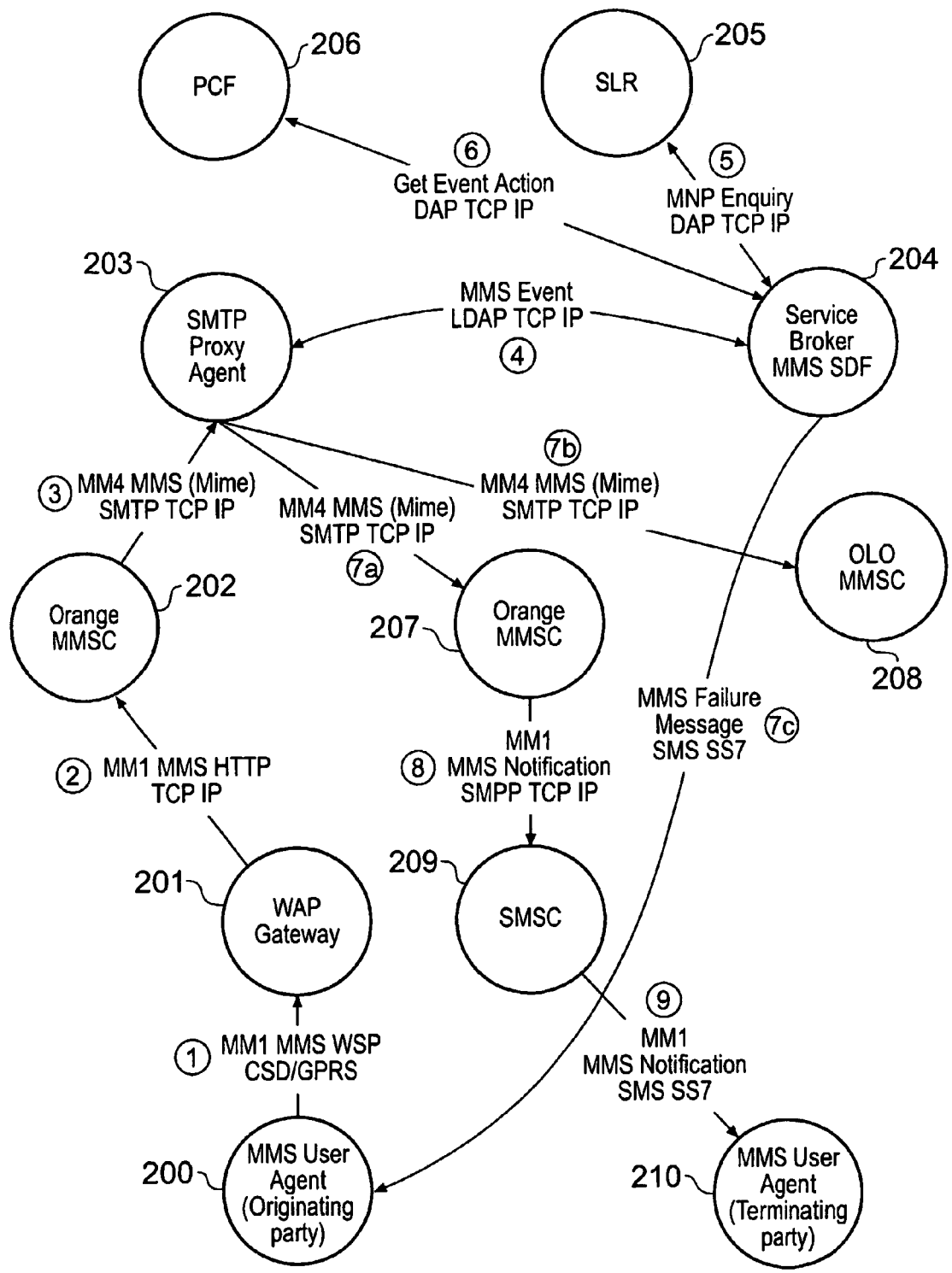
FIG. 8 is a flow chart illustrating processing in the embodiment of FIG. 7.

The flow of signals in the embodiments of FIG. 7 will now be described with reference to FIG. 8. In FIG. 8, the numbers 1 to 9 illustrate stages in the signalling. Note that there are alternatives at steps 7a, 7b and 7c. Thus, a signal is originated at the MMS client 200, which will be software in the handset 100, and passed via gateway 201 to a MMSC 202. The MMSC 202 passes the signal to a transfer agent 203 corresponding to the transfer agent 113 which interrogates the service broker 204 at step 4. That service broker 204 may itself interrogate an SLR 205 corresponding to SLR unit 121 in FIG. 7, or a PCF 206 corresponding to the prepay control function 122. If the service broker determines that the call cannot be sent, a failure message 7c may be triggered to the originating party 200. Alternatively, if the service broker 204 determines the call can be handled, a signal is passed to a transfer agent 203 which may pass the call to an MMSC 207 of the same network of the MMSC 202 (indeed these can be the same MMSC) in step 7a, or to an MMSC 208 of another network in step 7b. The MMSC 207 then passes the call via that MMSC 209 to a corresponding SMSC 116 in step 8, and in step 9 passes the call to the destination 210.

The invention claimed is:

1. A method of operating a mobile telephone network, said network having a platform for processing a call, event or session, and a function which interacts with said platform to determine said processing, wherein said platform is able to carry out a plurality of call handling operations; said function carrying out the following steps:

a) determining call handling operations to be applied to said call, event or session generated to or for at least one mobile telephone of said mobile telephone network;

b) determining if said platform of said mobile telephone network is capable of carrying out said call handling operations to be applied to said call, event or session;

c) where said platform is capable of carrying out at least some of said call handling operations to be applied to said call, event or session, determining at said function data required to carry out said at least some of said call handling operations and determining a sequence of steps for said at least some of said call handling operations to enable said platform to process said call, event or session;

d) collecting, from a database, said data which said one platform requires to process said call, event or session;

e) causing said platform to process said call, event or session by carrying out said call handling operation in said sequence order and using said data;

f) determining at said function a second platform of said plurality capable of carrying out others of said services or call handling operations;

g) transferring said call, event or session to said second platform; and h) carrying out said others of said services or call handling operations at said second platform using said data.

2. A method according to claim 1, wherein said call, event or session has a first protocol and said function carries out the further step of:

converting said first protocol for said call, event, or session to a second protocol such that said second protocol is processable by said platform.

3. A method according to claim 1, wherein said call, event or session is a multimedia message.

4. A method of operating a mobile telephone network, said network having a plurality of platforms for processing a call, event or session, and a function which interacts with said plurality of platforms to determine said processing, said function storing data necessary to carry out services or call handling operations for processing a call; the method comprising:

a) determining at said function said services or call handling operations to be applied to said call, event or session generated to or for at least one mobile telephone of said mobile telephone network;

b) determining at said function if a first one of said platforms of said mobile telephone network is capable of carrying out said services or call handling operations;

c) where said function determines that a first platform of said plurality is capable of carrying out at least some of said services or call handling operations, determining at the function if a first sequence of steps is required at said first platform, when said function determines said first sequence of steps are required, causing said first platform to process said call, event or session using said data in said first sequence;

d) collecting said data necessary to carry out said services or call handling operations when said call, event or session is received by said first platform, thereby to store said data at said first platform;

e) determining at said function a second platform of said plurality capable of carrying out others of said services or call handling operations;

f) determining if a second sequence of steps is required at said second platform to process said call, event or session;

g) transferring said call, event or session to said second platform; and h) when said function determines said second sequence of steps are required, carrying out said others of said services or call handling operations at said second platform using said data in said second sequence.

5. A method according to claim 4, wherein said function carries out the further step:

i) converting a first protocol of said call, event or session processable by said first platform to a second protocol such that said second protocol is processable by at least one other platform of the plurality.

6. A method according to claim 4, wherein said call, event or session is a multimedia message.

7. A method of operating a mobile telephone network, said network having a plurality of platforms for processing a call, event or session, and a first function which interacts with said plurality of platforms to determine said processing, the method comprising:
- a) receiving said call, event or session generated to or for at least one mobile telephone of said mobile telephone network at a first platform of said plurality of platforms of said mobile telephone network;
- b) determining at said first function services or call handling operations to be applied to said call, event or session;
- c) collecting at said first function data necessary to carry out said services or call handling operations;
- d) determining if said first platform is capable of carrying out said services or call handling operations;
- e) where said determination is negative, transferring said call to a second platform of said plurality capable of carrying out said services or call handling operations;
- f) determining, at said first function, if a sequence of steps is required for said second platform to process said call, event or session; and
- g) transferring said data from said first function to said second platform, whereby said second platform carries out said service or call handling operations using said data in said sequence when said first function determines said sequence of steps are required.

8. A method according to claim 7, wherein said step (c) includes merging data from at least some of said plurality of platforms and forming a common data set for processing of said call, event or session.

9. A method according to claim 7 wherein said call, event or session has a first protocol and further comprising:
- h) converting, at a second function, said first protocol to a second protocol such that said second protocol is processable by said second platform.

10. A method according to claim 7, wherein said call, event or session is a multimedia message.

11. A mobile telephone network, said network having a platform for processing a call, event or session, a database for storing data, and a function which interacts with said platform to determine said processing, wherein said platform is able to carry out a plurality of call handling operations; said function being configured to:
- a) determine call handling operations to be applied to said call, event or session generated to or for at least one mobile telephone of said mobile telephone network;
- b) determine if said platform of said mobile telephone network is capable of carrying out said call handling operations required by said call, event or session;
- c) where said platform is capable of carrying out at least some of said call handling operations required by said call, event or session, determine at said function data required to carry out said at least some of said call handling operations and determining a sequence of steps for said at least some of said call handling operations to enable said platform to process said call, even or session;
- d) collect, from said database, said data which said one platform requires to process said call, event or session;
- e) cause said platform to process said call, event or session by carrying out said call handling operation in said sequence order and using said data; and
- f) determining at said function a second platform of said plurality capable of carrying out others of said services or call handling operations;
- g) transferring said call, event or session to said second platform; and
- h) carrying out said others of said services or call handling operations at said second platform using said data.

12. A mobile telephone network, the network having a plurality of platforms for processing a call, event or session, and a function which interacts with said plurality of platforms to determine said processing, said function storing data necessary to carry out services or call handling operations; the network configured to:
- a) determine at said function said services or call handling operations to be applied to said call, event or session generated to or for at least one mobile telephone of said mobile telephone network;
- b) determine at said function if a first one of said platforms of said mobile telephone network is capable of carrying out said services or call handling operations;
- c) where said function determines that a first platform of said plurality is capable of carrying out at least some of said services or call handling operations, determining at the function if a first sequence of steps is required at said first platform, when said function determines said first sequence of steps are required, cause said first platform to process said call, event or session using said data in said first sequence;
- d) collecting said data necessary to carry out said services or call handling operations when said call, event or session is received by said first platform, thereby to store said data at said first platform;
- e) determine at said function a second platform of said plurality capable of carrying out others of said services or call handling operations;
- f) determining if a second sequence of steps is required at said second platform to process said call, event or session;
- g) transfer said call, event or session to said second platform; and
- h) when said function determines said second sequence of steps are required, carry out said others of said services or call handling operations at said second platform using said data.

13. A mobile telephone network, said network having a plurality of platforms for processing a call, event or session, and a function which interacts with said plurality of platforms to determine said processing, said network configure to:
- a) receive said call, event or session generated to or for at least one mobile telephone of said mobile telephone network at a first platform of said plurality of platforms of said mobile telephone network;
- b) determine at said function services or call handling operations to be applied to said call, event or session;
- c) collect at said function data necessary to carry out said services or call handling operations;
- d) determine if said first platform is capable of carrying out said services or call handling operations;
- e) where said determination is negative, transfer said call, event or session to a platform of said plurality capable of carrying out said services or call handling operations;
- f) determining, at said first function, if a sequence of steps is required for said second platform to process said call, event or session; and
- g) transfer said data from said function to said second platform, whereby said second platform carries out said service or call handling operations using said data in said sequence.

* * * * *

UNITED STATES PATENT AND TRADEMARK OFFICE
CERTIFICATE OF CORRECTION

| | | |
|---|---|---|
| PATENT NO. | : 7,653,389 B2 | Page 1 of 1 |
| APPLICATION NO. | : 10/497552 | |
| DATED | : January 26, 2010 | |
| INVENTOR(S) | : Eales et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this

Twenty-sixth Day of October, 2010

David J. Kappos
*Director of the United States Patent and Trademark Office*